US012515735B2

(12) United States Patent
Nakagawa et al.

(10) Patent No.: US 12,515,735 B2
(45) Date of Patent: Jan. 6, 2026

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Yuto Nakagawa, Okazaki (JP); Terutaka Tamaizumi, Okazaki (JP); Yuki Inden, Okazaki (JP); Saki Takahashi, Seto (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/543,558

(22) Filed: Dec. 18, 2023

(65) Prior Publication Data
US 2024/0208565 A1 Jun. 27, 2024

(30) Foreign Application Priority Data
Dec. 27, 2022 (JP) .................................. 2022-209632

(51) Int. Cl.
*B62D 6/00* (2006.01)
*B62D 5/00* (2006.01)
(Continued)

(52) U.S. Cl.
CPC ............. *B62D 6/008* (2013.01); *B62D 5/006* (2013.01); *B62D 5/0424* (2013.01); *B62D 5/046* (2013.01); *B62D 6/08* (2013.01)

(58) Field of Classification Search
None
See application file for complete search history.

(56) References Cited

U.S. PATENT DOCUMENTS

| 6,625,530 B1 * | 9/2003 | Bolourchi | B62D 6/008 180/402 |
| 6,687,588 B2 * | 2/2004 | Demerly | B62D 6/10 318/434 |

(Continued)

FOREIGN PATENT DOCUMENTS

| CN | 113348126 A | * | 9/2021 | ............. B62D 6/002 |
| CN | 109552401 B | * | 9/2022 | ............. B62D 6/008 |

(Continued)

OTHER PUBLICATIONS

Jun. 3, 2024 Extended European Search Report issued in European Patent Application No. 23219021.5.

*Primary Examiner* — Kevin R Steckbauer
(74) *Attorney, Agent, or Firm* — Oliff PLC

(57) ABSTRACT

A steering control device includes a processor. The processor is configured to execute a process in a state where dynamic force transmission between a steering wheel and a turning wheel is not performed. The process includes: a process of controlling a reaction force that is given to the steering wheel, by operating torque of the reaction force motor depending on the value of a reaction force command variable; a process of reflecting a predetermined component of a frequency signal that is given to the turning wheel in the value of the reaction force command variable; and a process of restricting the degree of contribution of the predetermined component to the value of the reaction force command variable, to a smaller degree, in a situation where a steering system including the steering wheel is unstable.

7 Claims, 3 Drawing Sheets

(51) Int. Cl.
 *B62D 5/04* (2006.01)
 *B62D 6/08* (2006.01)

(56) References Cited

U.S. PATENT DOCUMENTS

| | | | | |
|---|---|---|---|---|
| 7,246,679 | B2* | 7/2007 | Kasahara | B62D 5/003 |
| | | | | 180/443 |
| 7,418,326 | B2* | 8/2008 | Ogawa | B62D 6/008 |
| | | | | 701/41 |
| 7,516,812 | B2* | 4/2009 | Hara | B62D 6/008 |
| | | | | 180/405 |
| 8,050,824 | B2* | 11/2011 | Tamaizumi | B62D 5/0463 |
| | | | | 180/443 |
| 8,099,211 | B2* | 1/2012 | Nishimura | B62D 5/0472 |
| | | | | 180/443 |
| 9,193,379 | B2* | 11/2015 | Jang | B62D 5/0472 |
| 9,457,837 | B2* | 10/2016 | Kudo | B62D 6/008 |
| 9,545,945 | B2* | 1/2017 | Akatsuka | B62D 15/025 |
| 9,896,124 | B2* | 2/2018 | Toda | B62D 6/008 |
| 9,988,074 | B2* | 6/2018 | Hirate | B62D 5/0463 |
| 10,913,485 | B2* | 2/2021 | Toda | B62D 5/0481 |
| 11,110,912 | B2* | 9/2021 | Isshiki | B60W 30/02 |
| 11,192,579 | B2* | 12/2021 | Ishida | B62D 5/0463 |
| 11,273,864 | B2* | 3/2022 | Matsuo | B62D 6/008 |
| 11,511,799 | B2* | 11/2022 | Tardy-Tuch | B62D 1/04 |
| 11,597,432 | B2* | 3/2023 | Fraison | B62D 1/04 |
| 11,628,878 | B2* | 4/2023 | Matsuo | B62D 15/021 |
| | | | | 701/41 |
| 12,157,527 | B2* | 12/2024 | Matsuo | B62D 15/021 |
| 12,195,107 | B2* | 1/2025 | Endo | H02P 6/34 |
| 2003/0055546 | A1* | 3/2003 | Demerly | B62D 6/008 |
| | | | | 180/443 |
| 2006/0037806 | A1* | 2/2006 | Kasahara | B62D 6/008 |
| | | | | 180/402 |
| 2007/0169984 | A1* | 7/2007 | Ogawa | B62D 6/008 |
| | | | | 180/402 |
| 2008/0230300 | A1* | 9/2008 | Hara | B62D 6/008 |
| | | | | 180/402 |
| 2008/0262678 | A1* | 10/2008 | Nishimura | B62D 5/0472 |
| | | | | 701/42 |
| 2009/0112405 | A1* | 4/2009 | Tamaizumi | B62D 5/0466 |
| | | | | 701/41 |
| 2009/0216407 | A1* | 8/2009 | Cottard | B62D 5/0472 |
| | | | | 701/42 |
| 2015/0066299 | A1* | 3/2015 | Jang | B62D 5/0466 |
| | | | | 701/41 |
| 2015/0120140 | A1* | 4/2015 | Kudo | B62D 6/008 |
| | | | | 701/41 |
| 2016/0129933 | A1* | 5/2016 | Akatsuka | B62D 15/025 |
| | | | | 180/446 |
| 2017/0066474 | A1* | 3/2017 | Toda | B62D 5/0466 |
| 2017/0144696 | A1* | 5/2017 | Hirate | B62D 5/0463 |
| 2019/0039641 | A1* | 2/2019 | Toda | B62D 6/008 |
| 2019/0359203 | A1* | 11/2019 | Isshiki | B60W 30/025 |
| 2020/0130737 | A1* | 4/2020 | Kodera | B62D 6/008 |
| 2020/0130738 | A1* | 4/2020 | Kodera | B62D 6/008 |
| 2020/0283062 | A1* | 9/2020 | Kudo | B62D 5/006 |
| 2020/0307680 | A1* | 10/2020 | Kakimoto | B62D 5/0463 |
| 2020/0317259 | A1* | 10/2020 | Fraison | B62D 1/04 |
| 2020/0317263 | A1* | 10/2020 | Tardy-Tuch | B62D 1/20 |
| 2020/0324812 | A1* | 10/2020 | Matsuo | B62D 6/002 |
| 2020/0331523 | A1* | 10/2020 | Matsuo | B62D 6/08 |
| 2020/0339184 | A1* | 10/2020 | Matsuo | B62D 6/002 |
| 2023/0202554 | A1* | 6/2023 | Endo | B62D 5/0463 |
| | | | | 701/41 |
| 2023/0202559 | A1* | 6/2023 | Endo | B62D 5/0463 |
| | | | | 701/41 |
| 2023/0202560 | A1* | 6/2023 | Endo | B62D 6/008 |
| | | | | 701/41 |
| 2023/0227097 | A1* | 7/2023 | Ojima | B62D 5/0484 |
| | | | | 701/43 |
| 2024/0149940 | A1* | 5/2024 | Matsuda | B62D 5/0481 |
| 2024/0208565 | A1* | 6/2024 | Nakagawa | B62D 6/008 |
| 2024/0425108 | A1* | 12/2024 | Hosono | B62D 5/0469 |
| 2025/0121882 | A1* | 4/2025 | Loos | B62D 6/008 |
| 2025/0236334 | A1* | 7/2025 | Kudo | B62D 5/006 |

FOREIGN PATENT DOCUMENTS

| | | | | |
|---|---|---|---|---|
| CN | 113348126 B | * | 2/2024 | B62D 6/002 |
| CN | 118254871 A | * | 6/2024 | B62D 5/006 |
| CN | 119176183 A | * | 12/2024 | B62D 6/00 |
| EP | 1600359 A2 | * | 11/2005 | B62D 6/008 |
| EP | 3647161 A1 | * | 5/2020 | B62D 6/10 |
| EP | 3705382 A1 | * | 9/2020 | B62D 15/0205 |
| EP | 3715219 A1 | * | 9/2020 | B62D 5/046 |
| EP | 4393793 A1 | * | 7/2024 | B62D 5/006 |
| JP | 2002160655 A | * | 6/2002 | |
| JP | 2007161099 A | * | 6/2007 | |
| JP | 4608948 B2 | * | 1/2011 | B62D 5/003 |
| JP | 6058221 B2 | * | 1/2017 | B62D 6/008 |
| JP | 6591052 B2 | * | 10/2019 | B62D 5/0481 |
| JP | 2019209789 A | * | 12/2019 | B62D 1/04 |
| JP | 2020069861 A | * | 5/2020 | B62D 6/008 |
| JP | 2020069862 A | * | 5/2020 | B62D 6/002 |
| JP | 2020-142704 A | | 9/2020 | |
| JP | 2024069026 A | * | 5/2024 | B62D 5/0481 |
| JP | 2024093327 A | * | 7/2024 | B62D 5/006 |
| JP | 2024130883 A | * | 9/2024 | |

* cited by examiner

STEERING CONTROL DEVICE

CROSS-REFERENCE TO RELATED APPLICATION

This application claims priority to Japanese Patent Application No. 2022-209632 filed on Dec. 27, 2022, incorporated herein by reference in its entirety.

BACKGROUND

1. Technical Field

The present disclosure relates to a steering control device.

2. Description of Related Art

For example, Japanese Unexamined Patent Application Publication No. 2020-142704 describes a so-called steer-by-wire system (referred to as an SBW, hereinafter) in which dynamic force transmission between a steering wheel and a turning wheel is not performed. In the SBW, a road surface reaction force that is a force that the turning wheel receives from a road surface is not transmitted to the steering wheel. Therefore, it is difficult for a driver to have a moderate steering feeling for the road surface reaction force.

Hence, a control device described in the above literature sets the reaction force that is given to the steering wheel, depending on a predetermined frequency component of electric current in a motor that turns the turning wheel. The electric current that flows through the motor reflects the road surface reaction force. Accordingly, with the above control device, it is possible to transmit the road surface reaction force to the steering wheel.

SUMMARY

When the reaction force that is given to the steering wheel is set depending on the predetermined frequency component as described above in a situation where a system including the SBW is unstable, there is a possibility that the control cannot be appropriately performed. When the control cannot be appropriately performed, there is a possibility that the steering wheel vibrates beyond the influence of the road surface reaction force.

1. A steering control device according to an aspect of the present disclosure controls a steering device. The steering device includes a steering wheel, a turning wheel, and a reaction force motor that gives a reaction force against an operation by a driver, to the steering wheel. The steering control device includes a processor. The processor is configured to execute a reaction force command variable calculation process, a reaction force control process, a predetermined-component reflection process, and a restriction process, in a state where dynamic force transmission between the steering wheel and the turning wheel is not performed. The reaction force command variable calculation process is a process of calculating the value of a reaction force command variable. The reaction force command variable is a command value of a reaction force variable, and the reaction force variable is a variable that indicates torque of the reaction force motor. The reaction force control process is a process of controlling the reaction force that is given to the steering wheel, by operating the torque of the reaction force motor depending on the value of the reaction force command variable. The predetermined-component reflection process is a process of reflecting a predetermined component in the value of the reaction force command variable, the predetermined component being included in a frequency signal that is given to the turning wheel. The restriction process is a process of restricting the degree of contribution of the predetermined component to the value of the reaction force command variable, to a smaller degree, in a situation where a steering system including the steering wheel is unstable.

In the above configuration, in the situation where the steering system including the steering wheel is unstable, the degree of the contribution of the predetermined component to the value of the reaction force command variable is restricted to a smaller degree. Thereby, it is possible to restrain the steering wheel from vibrating due to the giving of the predetermined component to the torque of the reaction force motor in the unstable situation.

2. The restriction process may include a process of determining that the steering system is unstable, when the detection value of steering torque is equal to or larger than a predetermined value. The steering torque may be torque that is input to the steering wheel by a driver.

When the magnitude of the detection value of the steering torque is excessively large, it is not possible to appropriately perform the control using the detection value of the steering torque as an input, because the detection value of the steering torque exceeds the maximum of the steering torque that can be accurately detected by a sensor that detects the steering torque, for example. That is, when the magnitude of the detection value of the steering torque is excessively large, the system is unstable. Hence, in the above configuration, when the detection value of the steering torque is equal to or larger than the predetermined value, the determination of the unstable situation is made.

3. The restriction process may be a process of altering the degree of the contribution depending on the magnitude of the detection value of the steering torque, and be a process of setting the degree of the contribution when the magnitude of the detection value is large, to equal to or smaller than the degree of the contribution when the magnitude of the detection value is small.

When the detection value of the steering torque is excessively large, the system is likely to be more unstable as the magnitude of the detection value of the steering torque is larger. Hence, in the above configuration, based on the condition that the degree of the contribution when the magnitude of the detection value is large is set to equal to or smaller than the degree of the contribution when the magnitude of the detection value is small, the degree of the contribution is altered depending on the magnitude of the detection value. Thereby, it is possible to appropriately restrict the degree of the contribution of the predetermined component to the value of the reaction force command variable, depending on the degree of the unstableness of the system.

4. The reaction force command variable calculation process may include an assist torque calculation process. The assist torque calculation process may be a process of calculating assist torque, using the detection value of the steering torque as an input. The value of the reaction force command variable may be a value that is calculated depending on the assist torque. The magnitude of the assist torque may have a positive correlation with the magnitude of the detection value. The restriction process may include a process of determining that the magnitude of the detection value is equal to or larger than the predetermined value and the steering system is unstable, when the magnitude of the assist torque is equal to or larger than a predetermined value.

The magnitude of the assist torque has a positive correlation with the magnitude of the detection value of the steering torque. Therefore, it is possible to know the magnitude of the detection value of the steering torque, based on the magnitude of the assist torque.

5. The reaction force command variable calculation process may include an assist torque calculation process and a system stabilization process. The assist torque calculation process may be a process of calculating assist torque, using the detection value of steering torque as an input. The steering torque may be torque that is input to the steering wheel by a driver. The system stabilization process may be a process of correcting the assist torque, using the time derivative value of the detection value of the steering torque as an input. The value of the reaction force command variable may be a value that is calculated depending on the corrected assist torque. The restriction process may include a process of determining that the steering system is unstable, when the magnitude of the correction amount of the assist torque in the system stabilization process is equal to or larger than a predetermined value.

When the magnitude of the correction amount is excessively large, the system is likely to be unstable. Hence, in the above configuration, when the magnitude of the correction amount is equal to or larger than the predetermined value, the determination of the unstable situation is made.

6. The restriction process may be a process of altering the degree of the contribution depending on the magnitude of the correction amount of the assist torque, and be a process of setting the degree of the contribution when the magnitude of the correction amount of the assist torque is large, to equal to or smaller than the degree of the contribution when the magnitude of the correction amount of the assist torque is small.

When the magnitude of the correction amount is excessively large, the system is likely to be more unstable as the magnitude of the correction amount is larger. Hence, in the above configuration, based on the condition that the degree of the contribution when the magnitude of the correction amount is large is set to equal to or smaller than the degree of the contribution when the magnitude of the correction amount is small, the degree of the contribution is altered depending on the magnitude of the correction amount. Thereby, it is possible to appropriately restrict the degree of the contribution of the predetermined component to the value of the reaction force command variable, depending on the degree of the unstableness of the system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Premise Configuration

Figure 1:
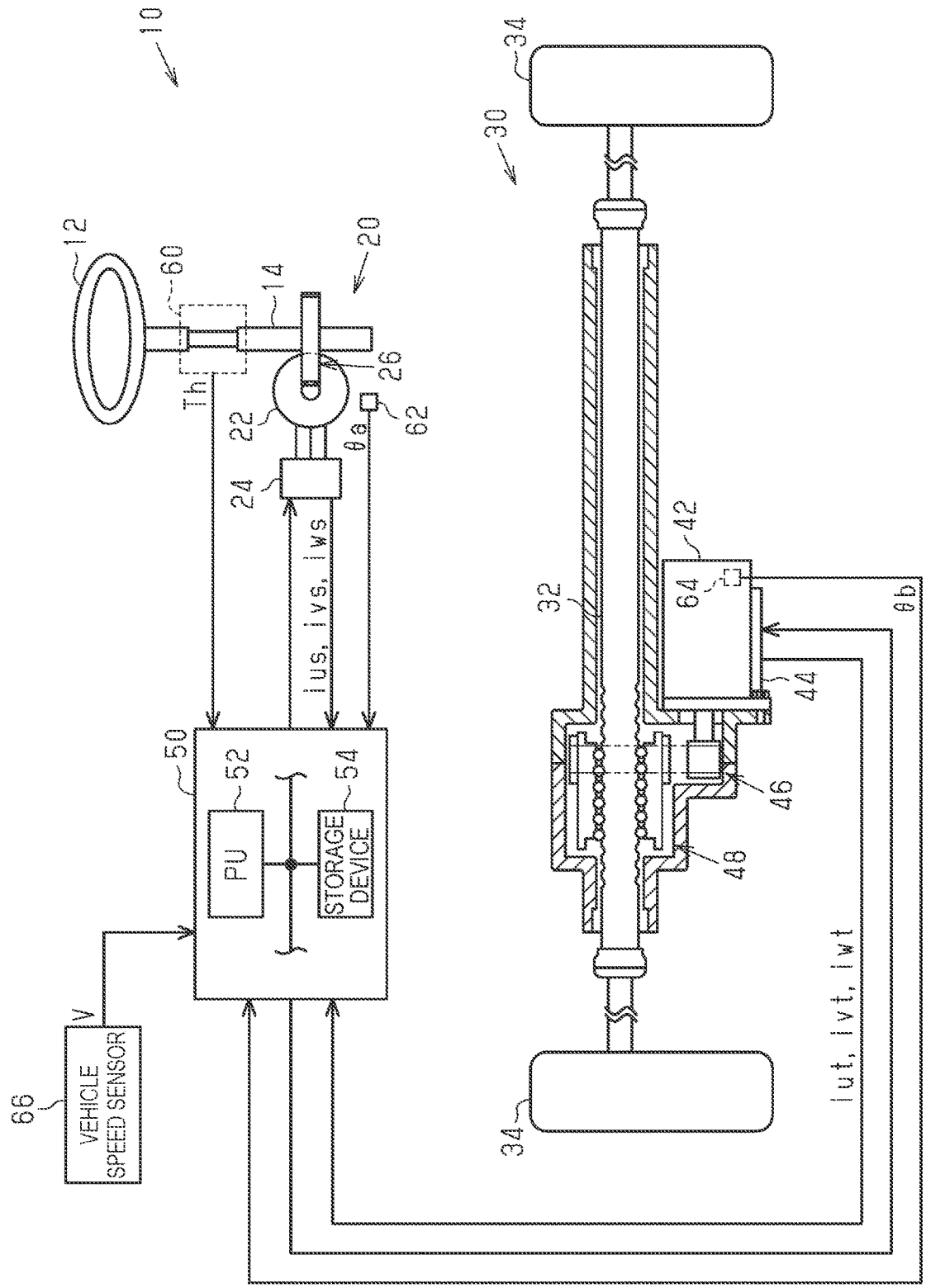
FIG. 1 is a diagram showing the configuration of a steering device and a steering control device according to an embodiment.

An embodiment of a steering control device will be described with reference to the drawings. A steering device 10 of a vehicle shown in FIG. 1 is a steer-by-wire type device. The steering device 10 includes a steering wheel 12, a steering shaft 14, a reaction force actuator 20, and a turning actuator 30. The steering shaft 14 is coupled to the steering wheel 12. The reaction force actuator 20 is an actuator that gives a force against a force when a driver operates the steering wheel 12. The reaction force actuator 20 includes a reaction force motor 22, a reaction force inverter 24, and a reaction force speed reducer 26. The reaction force motor 22 gives a steering reaction force that is a force against steering to the steering wheel 12 through the steering shaft 14. The reaction force motor 22 is coupled to the steering shaft 14 through the reaction force speed reducer 26. For the reaction force motor 22, as an example, a three-phase synchronous electric motor is employed. For example, the reaction force speed reducer 26 is constituted by a worm-and-wheel. The steering device 10 is an example of the steering system including the steering wheel. Further, the steering device 10 is occasionally referred to as the system shown in FIG. 1.

The turning actuator 30 is an actuator that is used in order to turn turning wheels 34 depending on driver's intention about steering that is indicated by driver's operation of the steering wheel 12. The turning actuator 30 includes a rack shaft 32, a turning motor 42, a turning inverter 44, a turning transmission mechanism 46, and a transduction mechanism 48. For the turning motor 42, as an example, a three-phase surface-magnet synchronous electric motor (SPM) is employed. The turning transmission mechanism 46 is a belt transmission mechanism. By the turning transmission mechanism 46, a rotative dynamic force of the turning motor 42 is transmitted to the transduction mechanism 48. The transduction mechanism 48 transduces the transmitted rotative dynamic force to a displacement dynamic force in the axial direction of the rack shaft 32. The turning wheels 34 are turned by the displacement of the rack shaft 32 in the axial direction.

The steering control device 50 adopts the steering wheel 12 and the turning wheels 34, as control objects. That is, the steering control device 50 controls a steering reaction force against the steering by the driver, as a controlled variable for the steering wheel 12 that is the control object. Further, the steering control device 50 controls a turning angle as a controlled variable for the turning wheels 34 that are the control objects. The turning angle is the moving angle of tires as the turning wheels 34.

For the control of controlled variables, the steering control device 50 refers to a steering torque Th that is detected by a torque sensor 60. The steering torque Th is a torque that is given to the steering shaft 14 through driver's operation of the steering wheel 12. For the control of controlled variables, the steering control device 50 refers to a rotation angle θa that is the angle of a rotation shaft of the reaction force motor 22 and that is detected by a steering side rotation angle sensor 62. Further, for the control of controlled variables, the steering control device 50 refers to electric currents ius, ivs, iws that flow through the reaction force motor 22. For example, the electric currents ius, ivs, iws may be detected as voltage drop amounts at shunt resistors provided in respective legs of the reaction force inverter 24. For the control of controlled variables, the steering control device 50 refers to a rotation angle θb that is the angle of a rotation shaft of the turning motor 42 and that is detected by a turning side rotation angle sensor 64. Further, for the control of controlled variables, the steering control device 50 refers to electric currents iut, ivt, iwt that flow through the turning motor 42. For example, the electric currents iut, ivt, iwt may be detected as voltage drop amounts at shunt resistors provided in respective legs of the turning inverter 44. The steering control device 50 refers to a vehicle speed V that is detected by a vehicle speed sensor 66.

The steering control device 50 includes a processor unit 52 (referred to as a PU 52, hereinafter) and a storage device 54. The PU 52 is a software processing device such as a CPU, a GPU, and a TPU. The storage device 54 May be a non-volatile memory in which electric rewriting cannot be performed. Further, the storage device 54 May be a non-volatile memory in which electric rewriting can be performed, or may be a storage medium such as a disk medium.

Outline of Control

Figure 2:
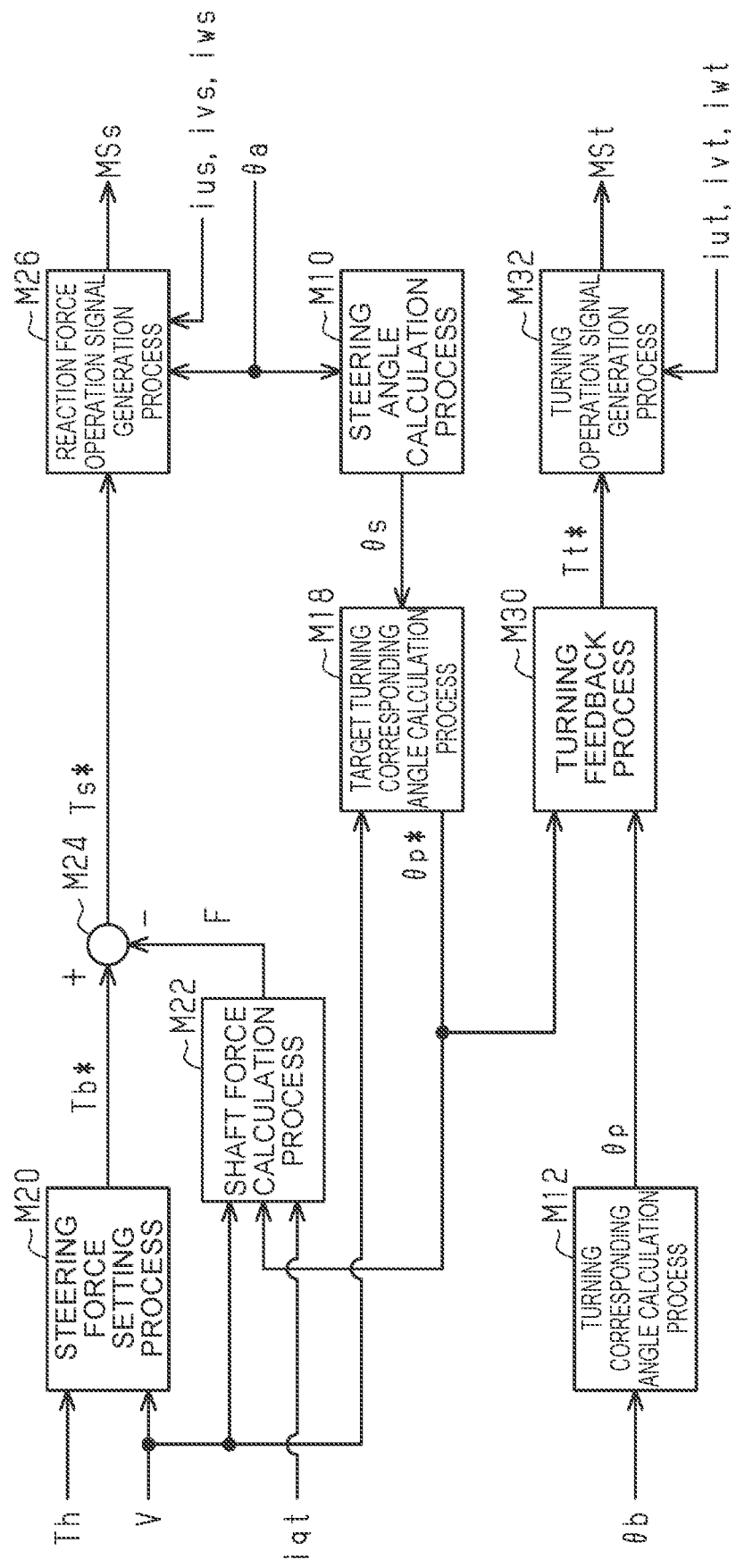
FIG. 2 is a block diagram showing processes that are executed by the steering control device according to the embodiment.

FIG. 2 shows processes that are executed in the steering control device 50. The processes shown in FIG. 2 are realized when the PU 52 repeatedly executes programs stored in the storage device 54, with a predetermined period, for example.

A steering angle calculation process M10 includes a process of converting the rotation angle θa into an integrated angle including a range exceeding 360 degrees, for example, by counting the rotation number of the reaction force motor 22 from a steering neutral position that is the position of the steering wheel 12 when the vehicle moves straight. The steering angle calculation process M10 includes a process of computing a steering angle θs, by multiplying the integrated angle obtained by the conversion by a conversion factor based on the rotation speed ratio of the reaction force speed reducer 26.

A turning corresponding angle calculation process M12 includes a process of converting the rotation angle θb into an integrated angle including a range exceeding 360 degrees, for example, by counting the rotation number of the turning motor 42 from a rack neutral position that is the position of the rack shaft 32 when the vehicle moves straight. The turning corresponding angle calculation process M12 includes a process of calculating a turning corresponding angle θp corresponding to the turning angle of the turning wheels 34, by multiplying the integrated angle obtained by the conversion by a conversion factor depending on the reduction ratio of the turning transmission mechanism 46, a lead of the transduction mechanism 48, and the like. The turning corresponding angle θp is an amount that has a proportional relation with the turning angle. As an example, the turning corresponding angle θp is positive in the case of an angle on the right side of the rack neutral position, and is negative in the case of an angle on the left side of the rack neutral position.

A target turning corresponding angle calculation process M18 is a process of calculating a target turning corresponding angle θp*, depending on the steering angle θs and the vehicle speed V. A steering force setting process M20 is a process of calculating a steering force Tb*, using the steering torque Th and the vehicle speed V as inputs. The steering force Tb* is an amount in the same direction as the direction of the steering by the driver. The magnitude of the steering force Tb* is set to a large value when the force for assisting the steering by the driver is large.

A shaft force calculation process M22 is a process of calculating a shaft force F that acts on the rack shaft 32 through the turning wheels 34, using a vehicle speed V, a q-axis electric current iqt of the turning motor 42, and the target turning corresponding angle θp* as inputs. The shaft force F is converted into a torque that is given to the steering shaft 14. The shaft force F is an amount that acts in the opposite direction of the direction of the steering by the driver. The shaft force calculation process M22 may be a process of calculating the shaft force F such that the absolute value of the shaft force F is larger as the absolute value of the target turning corresponding angle θp* is larger. Further, for example, the shaft force calculation process M22 may be a process of calculating the shaft force F such that the absolute value of the shaft force F is larger as the vehicle speed V is higher. Further, the shaft force calculation process M22 may be a process of calculating the shaft force F such that the absolute value of the shaft force F is larger as the absolute value of the q-axis electric current iqt is larger. The q-axis electric current iqt is calculated by the PU 52, depending on the turning corresponding angle θp and the electric currents iut, ivt, iwt.

A target reaction force calculation process M24 is a process of substituting a value resulting from subtracting the shaft force F from the steering force Tb*, into a target reaction force torque Ts*. The target reaction force torque Ts* is a target value of the torque that is given to the steering shaft 14 by the reaction force motor 22.

A reaction force operation signal generation process M26 is a process of generating an operation signal MSs for the reaction force inverter 24, in order to control the torque of the reaction force motor 22 such that the torque that is given to the steering shaft 14 becomes the target reaction force torque Ts*. More specifically, the reaction force operation signal generation process M26 includes a process of converting the target reaction force torque Ts* into a target torque of the reaction force motor 22. Further, the reaction force operation signal generation process M26 includes a process of calculating the operation signal MSs for the reaction force inverter 24, such that the electric current that flows through the reaction force motor 22 gets close to an electric current decided by the target torque, by the feedback control of the electric current. Actually, the operation signal MSs includes respective operation signals for six switching elements of the reaction force inverter 24.

A turning feedback process M30 is a process of substituting a manipulated variable in a feedback control in which the turning corresponding angle θp is used as a controlled variable and the target turning corresponding angle θp* is used as a target value of the controlled variable, into the target turning torque Tt*. The target turning torque Tt* satisfies a constant rate with respect to the torque of the turning motor 42.

A turning operation signal generation process M32 is a process of generating an operation signal MSt for the turning inverter 44, in order to control the torque of the turning motor 42 such that the torque of the turning motor 42 becomes a value that satisfies the constant rate with respect to the target turning torque Tt*. More specifically, the turning operation signal generation process M32 includes a process of converting the target turning torque Tt* into a target torque of the turning motor 42. Further, the turning operation signal generation process M32 includes a process of calculating the operation signal MSt for the turning inverter 44, such that the electric current that flows through the turning motor 42 gets close to an electric current decided by the target torque, by the feedback control of the electric current. Actually, the operation signal MSt includes respective operation signals for six switching elements of the turning inverter 44.

Details of Steering Force Setting Process M20

Figure 3:
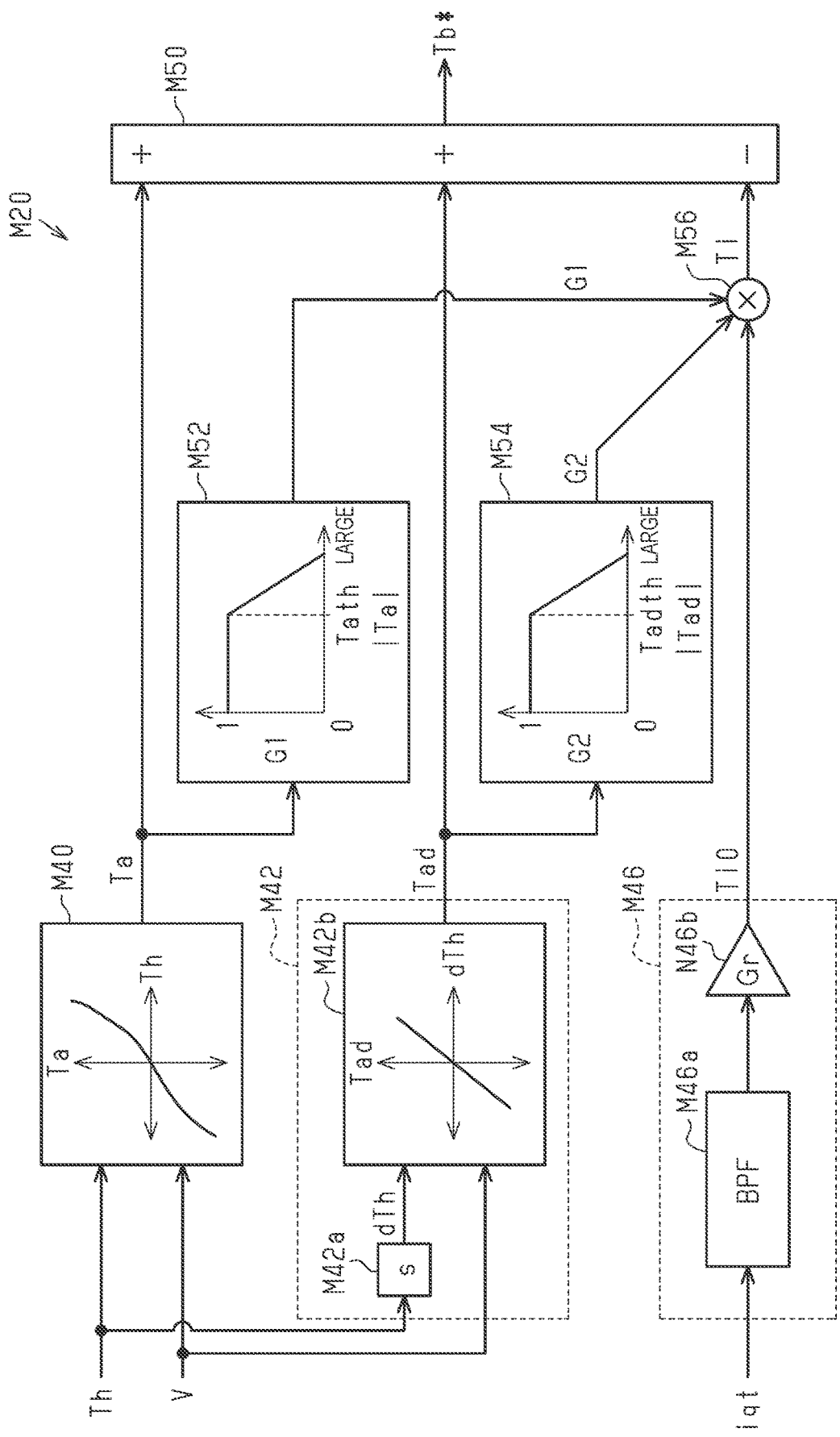
FIG. 3 is a block diagram showing details of a steering force setting process according to the embodiment.

FIG. 3 shows details of the steering force setting process M20. An assist torque calculation process M40 is a process of calculating an assist torque Ta, using the steering torque Th and the vehicle speed V as inputs. The assist torque calculation process M40 is a process of setting the magnitude of the assist torque Ta when the magnitude (absolute value) of the steering torque Th is large, to equal to or larger than the magnitude of the assist torque Ta when the magnitude of the steering torque Th is small. Further, the assist torque calculation process M40 is a process of altering the magnitude of the assist torque Ta depending on the vehicle speed V, even when the magnitude of the steering torque Th is identical. More specifically, the assist torque calculation process M40 may be a process of setting the magnitude of the assist torque Ta when the vehicle speed V is high, to equal to or smaller than the magnitude of the assist torque Ta when the vehicle speed V is low.

The assist torque calculation process M40 may be a process in which the PU 52 performs map computation for the assist torque Ta in a state where map data is stored in the storage device 54. The map data is data in which the steering torque Th and the vehicle speed V are used as input variables and the assist torque Ta is used as an output variable. In this map data, the value of the output variable when the vehicle speed V is identical includes values different from each other.

The map data is combination data of discrete values of the input variable and values of the output variable that respectively correspond to the values of the input variable. Further, the map computation may be a process of adopting a corresponding value of the output variable in the map data, as the computation result, when the value of the input variable coincides with one of the values of the input variable in the map data. Further, the map computation may be a process of adopting a value obtained by the interpolation among a plurality of values of the output variable included in the map data, as the computation result, when the value of the input variable does not coincide with any of the values of the input variable in the map data. Instead, the map computation may be a process of adopting a value of the output variable in the map data that corresponds to a value closest to the value of the input variable among a plurality of values of the input variable included in the map data, as the computation result, when the value of the input variable does not coincide with any of the values of the input variable in the map data.

A system stabilization process M42 is a process for restraining the resonance of the system shown in FIG. 1. The system stabilization process M42 includes a differentiation operator M42a and a compensation amount calculation process M42b. The differentiation operator M42a is a process of receiving the steering torque Th and calculating a steering speed dTh that is the first-order time derivative value of the steering torque Th. The compensation amount calculation process M42b is a process of calculating a system stabilization compensation amount Tad, using the steering speed dTh and the vehicle speed V as inputs. The compensation amount calculation process M42b may be a process of setting the magnitude of the system stabilization compensation amount Tad when the magnitude of the steering speed dTh is large, to equal to or larger than the magnitude of the system stabilization compensation amount Tad when the magnitude of the steering speed dTh is small. Further, the compensation amount calculation process M42b include a process of altering the system stabilization compensation amount Tad depending on the vehicle speed V, even when the steering speed dTh is identical.

For example, the system stabilization process M42 may be a process in which the PU 52 performs map computation for the system stabilization compensation amount Tad in a state where map data is stored in the storage device 54. The map data may be data in which the steering speed dTh and the vehicle speed V are used as input variables and the system stabilization compensation amount Tad is used as an output variable. In this map data, the value of the output variable when the vehicle speed V is identical includes values different from each other.

A road information generation process M46 is a process for superposing, on the steering wheel 12, information relevant to a road surface reaction force that is a force that is given from a road surface to the turning wheels 34. The road information generation process M46 includes a bandpass filter M46a and a gain multiplication process M46b. The q-axis electric current iqt is input to the bandpass filter M46a. The q-axis electric current iqt is input to the bandpass filter M46a, as a variable that includes a vibrational component of the turning wheels 34 due to the road surface reaction force. The bandpass filter M46a is a process of selectively extracting a signal in a vibrational frequency band due to the roughness of the road surface. The gain multiplication process M46b is a process of substituting a value resulting from multiplying an output value of the bandpass filter M46a by a gain Gr, into a road surface information torque Ti0.

A gain calculation process M52 is a process of calculating a gain G1, using the assist torque Ta as an input. The gain G1 has a value that is equal to or larger than "0" and is equal to or smaller than "1". The gain G1 is a variable for restricting the magnitude of a road surface information torque Ti, to a smaller value. The gain calculation process M52 is a process of setting the gain G1 when the magnitude of the assist torque Ta is large, to equal to or smaller than the gain G1 when the magnitude of the assist torque Ta is small. More specifically, the gain calculation process M52 is a process of setting the gain G1 to "1", when the magnitude of the assist torque Ta is smaller than a threshold Tath. Further, the gain calculation process M52 is a process of altering the gain G1 depending on the magnitude of the assist torque Ta, when the magnitude of the assist torque Ta is equal to or larger than the threshold Tath. More specifically, the gain calculation process M52 is a process of altering the gain G1, such that the gain G1 when the magnitude of the assist torque Ta is large is equal to or smaller than the gain G1 when the magnitude of the assist torque Ta is small. The threshold Tath is set depending on the maximum of the magnitude of the steering torque Th that can be accurately detected by the torque sensor 60. For example, the threshold Tath may be a value that is smaller by a predetermined amount than the magnitude of the assist torque Ta when the magnitude of the steering torque Th is the above maximum.

The gain calculation process M52 may be a process in which the PU 52 performs map computation for the gain G1, using map data stored in the storage device 54. The map data is data in which the assist torque Ta is used as an input variable and the gain G1 is used as an output variable. This map data is data in which the value of the output variable includes values different from each other.

A gain calculation process M54 is a process of calculating a gain G2, using the system stabilization compensation amount Tad as an input. The gain G2 has a value that is equal to or larger than "0" and is equal to or smaller than "1". The gain G2 is a variable for restricting the magnitude of the road surface information torque Ti, to a smaller value. The gain calculation process M54 is a process of setting the gain G2 when the magnitude of the system stabilization compensation amount Tad is large, to equal to or smaller than the gain G2 when the magnitude of the system stabilization compensation amount Tad is small. More specifically, the gain calculation process M54 is a process of setting the gain G2 to "1", when the magnitude of the system stabilization compensation amount Tad is smaller than a threshold Tadth. Further, the gain calculation process M54 is a process of altering the gain G2, when the magnitude of the system stabilization compensation amount Tad is equal to or larger than the threshold Tadth. More specifically, the gain calculation process M54 is a process of altering the gain G2, such that the gain G2 when the magnitude of the system stabilization compensation amount Tad is large is equal to or smaller than the gain G2 when the magnitude of the system stabilization compensation amount Tad is small.

The gain calculation process M54 may be a process in which the PU 52 performs map computation for the gain G2, using map data stored in the storage device 54. The map data is data in which the system stabilization compensation amount Tad is used as an input variable and the gain G2 is used as an output variable. This map data is data in which the value of the output variable includes values different from each other.

A multiplication process M56 is a process of inputting a value resulting from multiplying the road surface information torque Ti0 by the gain G1 and the gain G2, to the road surface information torque Ti. A steering force calculation process M50 is a process of inputting a value resulting from subtracting the road surface information torque Ti from the sum of the assist torque Ta and the system stabilization compensation amount Tad, to the steering force Tb*.

Operation and Effect of Embodiment

For example, when the road surface on which the vehicle travels has roughness, the road surface reaction force due to the roughness is given to the turning wheels 34. Regardless of the road surface reaction force, the PU 52 controls the torque of the turning motor 42 such that the turning corresponding angle θp follows the target turning corresponding angle θp*. Thereby, the torque of the turning motor 42 has a component that vibrates depending on the vibration of the road surface reaction force. Therefore, the q-axis electric current iqt has a component that vibrates depending on the vibration of the road surface reaction force. The PU 52 calculates the road surface information torque Ti depending on the q-axis electric current iqt. The PU 52 calculates the steering force Tb* based on the value resulting from subtracting the road surface information torque Ti from the assist torque Ta. Then, the torque of the reaction force motor 22 is operated depending on the steering force Tb*. Thereby, a component depending on the road surface reaction force is given to the steering wheel 12. Thereby, the driver can feel the road surface reaction force, from the force that is given to the steering wheel.

The PU 52 restricts the degree of the contribution of the road surface information torque Ti to the steering force Tb*, to a smaller degree, when the magnitude of the assist torque Ta is equal to or larger than the threshold Tath. The situation where the magnitude of the assist torque Ta increases so as to exceed the threshold Tath is, for example, a situation where the magnitude of the actual torque that is input to the steering wheel 12 by the driver exceeds the maximum that can be accurately detected by the torque sensor 60. Therefore, it is difficult for the PU 52 to appropriately perform the control depending on the magnitude of the actual torque that is input to the steering wheel 12 by the driver. This situation is a situation where the system shown in FIG. 1 is unstable. In the unstable situation, the road surface information torque Ti can cause the steering wheel 12 to vibrate beyond the vibration of the road surface reaction force. Hence, the PU 52 restricts the degree of the contribution of the road surface information torque Ti to the steering force Tb*, to a smaller degree. Thereby, it is possible to restrain the above vibration.

With the embodiment described above, an operation and effect described below are further obtained. (1) The PU 52 restricts the degree of the contribution of the road surface information torque Ti to the steering force Tb*, to a smaller degree, when the magnitude of the system stabilization compensation amount Tad is equal to or larger than the threshold Tadth. When the magnitude of the system stabilization compensation amount Tad is excessively large, the system can become unstable. Then, the unstable system can cause the steering wheel 12 to vibrate beyond the vibration of the road surface reaction force. Hence, the PU 52 restricts the degree of the contribution of the road surface information torque Ti to the steering force Tb*, to a smaller degree. Thereby, it is possible to restrain the above vibration.

The correspondence relation between matters in the above embodiment and matters described in SUMMARY is as follows. The correspondence relation will be shown below for each number of the solutions described in SUMMARY. [1] The assist torque calculation process M40, the system stabilization process M42, the steering force calculation process M50, the shaft force calculation process M22, and the target reaction force calculation process M24 constitute an example of the reaction force command variable calculation process. The reaction force operation signal generation process M26 is an example of the reaction force control process. The road information generation process M46 and the steering force calculation process M50 constitute an example of the predetermined-component reflection process. The gain calculation processes M52, M54 and the multiplication process M56 constitute an example of the restriction process. [2] The setting of the gain G1 depending on the assist torque Ta is an example of the configuration in "2.". [3] The setting of the gain G1 depending on the gain calculation process M52 is an example of the configuration in "3.". [4] The assist torque calculation process M40 is an example of the assist torque calculation process. [5] The assist torque calculation process M40 is an example of the assist torque calculation process. The system stabilization process M42 is an example of the system stabilization process. [6] The setting of the gain G2 in the gain calculation process M54 is an example of the configuration described in "6.". The system stabilization compensation amount Tad is an example of the correction amount of the assist torque.

Other Embodiments

The embodiment can be carried out while being modified as follows. The embodiment and the following modifications can be carried out while being combined with each other within a range in which there is no technical inconsistency.

In the system stabilization process, it is not always necessary to calculate the system stabilization compensation amount Tad from the two variables: the steering speed dTh and the vehicle speed V. For example, the system stabilization compensation amount Tad may be calculated depending on the steering speed dTh, without depending on the vehicle speed V.

The variable that is the input for the calculation of the system stabilization compensation amount Tad is not limited to the steering speed dTh and the vehicle speed V. For example, the input may include the rate of the change in the steering force Tb* with respect to the change in the steering torque Th. The steering force Tb* may be replaced with the assist torque Ta.

In the predetermined-component reflection process, the input for the road information generation process M46 is the q-axis electric current iqt in the above embodiment, but is not limited to this. For example, the torque of the turning motor 42 May be adopted. When the turning motor 42 is a SPM, the torque may have a value resulting from multiplying the q-axis electric current iqt by an armature interlinkage magnetic flux constant. Further, when the turning motor 42 is an embedded-magnet synchronous machine, the torque may have a value calculated by a predetermined model formula in which a d-axis electric current idt and the q-axis electric current iqt are used.

The predetermined-component reflection process does not always need to a process of outputting the value resulting from multiplying the value after the bandpass filter process of the time-series data about the value of the variable indicating the torque of the turning motor 42, by the gain Gr. For example, it is allowable to include a process of determining whether the road surface has roughness, based on the comparison of the value after the bandpass filter process and a threshold. In that case, it is allowable to adopt a process of outputting the value resulting from multiplying the value after the bandpass filter process by the gain Gr, only when it is determined that the road surface has roughness.

The road information generation process M46 does not always need to be included in the steering force setting process M20. For example, it is allowable to be included in the shaft force calculation process M22. In the restriction process, the gain G1 is set using the assist torque Ta as an input in the above embodiment, but is not limited to this. For example, the gain G1 may be set using the steering torque Th as an input.

The gain G1 depending on the value of the variable indicating the magnitude of the steering torque Th such as the assist torque Ta and the gain G2 depending on the system stabilization compensation amount Tad are calculated independently in the above embodiment, but are not limited to this. For example, a single gain may be calculated depending on the value of the variable showing the magnitude of the steering torque Th and the system stabilization compensation amount Tad. This can be realized, for example, by using map data in which the value of the variable indicating the magnitude of the steering torque Th and the system stabilization compensation amount Tad are used as input variables and the gain is used as an output variable.

For the restriction process, it is not always necessary to use the value of the variable indicating the magnitude of the steering torque Th and the system stabilization compensation amount Tad as inputs. For example, it is allowable to use the value of the variable indicating the magnitude of the steering torque Th as an input, without using the system stabilization compensation amount Tad as an input.

The reaction force command variable calculation process is not limited to the process exemplified in the above embodiment. For example, it is allowable to adopt a process of calculating the value of a variable indicating the torque of the reaction force motor 22, as a manipulated variable in a feedback control in which the steering torque Th is used as a controlled variable and a target value of the steering torque Th is used as a target value of the controlled variable. In that case, the PU 52 May control the torque of the reaction force motor 22, depending on a value resulting from correcting the manipulated variable in the feedback control based on the output of the road information generation process M46.

Further, in that case, for example, the restriction process may be a process of restricting the correction of the manipulated variable in the feedback control based on the output of the road information generation process M46, when the steering torque Th is equal to or larger than a predetermined value.

The steering control device is not limited to a device that executes software processing. For example, a dedicated hardware circuit as exemplified by an ASIC may be included to execute at least some of the processes that are executed in the above embodiment. That is, the steering control device may include a processing circuit that has one of configurations (a) to (c) described below. (a) A processing circuit including a processing device that executes all of the above processes in accordance with programs and a program storing device that stores the program, as exemplified by a storage device. (b) A processing circuit including a processing device that executes some of the above processes in accordance with programs, a program storing device, and a dedicated hardware circuit that executes the other processes. (c) A processing circuit including a dedicated hardware circuit that executes all of the above processes. A plurality of software execution devices including processing devices and program storing devices may be provided. Further, a plurality of dedicated hardware circuits may be provided.

The turning motor 42 does not always need to be a synchronous electric motor. For example, an induction motor may be adopted.

The steering device 10 has a link-less structure in which the steering wheel 12 and the turning wheels 34 are mechanically separated at all times, in the above embodiments, but without being limited to this, may have a structure in which the steering wheel 12 and the turning wheels 34 can be mechanically separated by a clutch.

What is claimed is:

1. A steering control device that controls a steering device, the steering device includes a steering wheel, a turning wheel, and a reaction force motor that gives a reaction force against an operation by a driver, to the steering wheel, the steering control device comprising a processor configured to execute a process in a state where dynamic force transmission between the steering wheel and the turning wheel is not performed, the process including:
a reaction force command variable calculation process of calculating a value of a reaction force command variable, the reaction force command variable being a command value of a reaction force variable, the reaction force variable being a variable that indicates torque of the reaction force motor;
a reaction force control process of controlling the reaction force that is given to the steering wheel, by operating the torque of the reaction force motor depending on the value of the reaction force command variable;
a predetermined-component reflection process of extracting a predetermined component and reflecting the predetermined component in the value of the reaction force command variable, the predetermined component being included in a frequency signal that is given to the turning wheel, and a signal in a vibrational frequency band due to a roughness of a road surface being selectively extracted as the predetermined component; and
a restriction process of judging whether it has been determined that a steering system including the steering wheel is unstable and, after judging that it has been determined that a steering system including the steering wheel is unstable, restricting a degree of contribution of the predetermined component to the value of the reaction force command variable, to a smaller degree.

2. The steering control device according to claim 1, wherein
the restriction process includes a process of judging whether a detection value of steering torque is equal to or larger than a predetermined value and, after judging that a detection value of steering torque is equal to or larger than a predetermined value, determining that the steering system is unstable, and
the steering torque is torque that is input to the steering wheel by a driver.

3. The steering control device according to claim 2, wherein
the restriction process is a process of altering the degree of the contribution depending on a magnitude of the detection value of the steering torque, and is a process of setting the degree of the contribution when the magnitude of the detection value is large, to equal to or smaller than the degree of the contribution when the magnitude of the detection value is small.

4. The steering control device according to claim 3, wherein
the reaction force command variable calculation process includes an assist torque calculation process,
the assist torque calculation process is a process of calculating assist torque, using the detection value of the steering torque as an input,
the value of the reaction force command variable is a value that is calculated depending on the assist torque, and a magnitude of the assist torque has a positive correlation with the magnitude of the detection value, and
the restriction process includes a process of determining that the magnitude of the detection value is equal to or larger than the predetermined value and the steering system is unstable, when the magnitude of the assist torque is equal to or larger than a predetermined value.

5. The steering control device according to claim 1, wherein
the reaction force command variable calculation process includes an assist torque calculation process and a system stabilization process,
the assist torque calculation process is a process of calculating assist torque, using a detection value of steering torque as an input, and the steering torque is torque that is input to the steering wheel by a driver,
the system stabilization process is a process of correcting the assist torque, using a time derivative value of the detection value of the steering torque as an input, and the value of the reaction force command variable is a value that is calculated depending on the corrected assist torque, and
the restriction process includes a process of determining that the steering system is unstable, when a magnitude of a correction amount of the assist torque in the system stabilization process is equal to or larger than a predetermined value.

6. The steering control device according to claim 5, wherein
the restriction process is a process of altering the degree of the contribution depending on the magnitude of the correction amount of the assist torque, and is a process of setting the degree of the contribution when the magnitude of the correction amount of the assist torque is large, to equal to or smaller than the degree of the contribution when the magnitude of the correction amount of the assist torque is small.

7. The steering control device according to claim 1, wherein
the restriction process includes restricting the degree of the contribution of the predetermined component by multiplying the predetermined component by a variable between 0 and 1.

* * * * *